(12) United States Patent
Stewart

(10) Patent No.: US 9,009,046 B1
(45) Date of Patent: Apr. 14, 2015

(54) SYSTEM AND METHOD FOR DISAMBIGUATING MULTIPLE INTENTS IN A NATURAL LANGUAGE DIALOG SYSTEM

(75) Inventor: Osamuyimen Thompson Stewart, Piscataway, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1966 days.

(21) Appl. No.: 11/235,742

(22) Filed: Sep. 27, 2005

(51) Int. Cl.
G10L 15/00 (2013.01)
G10L 15/19 (2013.01)
G10L 15/08 (2006.01)

(52) U.S. Cl.
CPC ..................................... G10L 15/08 (2013.01)

(58) Field of Classification Search
CPC ....... G10L 15/18; G10L 15/063; G10L 15/19; G10L 15/1815; G10L 15/197; G10L 15/24; G10L 15/1822; G10L 15/22; G10L 15/26; G10L 21/06; G10L 15/187; G10L 15/30; G06F 17/2715; G06F 17/28; G06F 3/167; G06F 9/54
USPC .............. 704/270, 270.1, 246, 257, 275, 251, 704/235, 247, 252
See application file for complete search history.

(56) References Cited

U.S. PATENT DOCUMENTS

| | | | | |
|---|---|---|---|---|
| 5,983,177 A * | 11/1999 | Wu et al. | ........................ | 704/244 |
| 6,224,636 B1 * | 5/2001 | Wegmann et al. | ............. | 704/246 |
| 6,374,210 B1 * | 4/2002 | Chu | ................... | 704/9 |
| 6,594,629 B1 * | 7/2003 | Basu et al. | ..................... | 704/251 |
| 7,246,062 B2 * | 7/2007 | Knott et al. | .................... | 704/246 |
| 7,260,537 B2 * | 8/2007 | Creamer et al. | ........... | 704/270.1 |
| 7,386,454 B2 * | 6/2008 | Gopinath et al. | ............. | 704/270 |
| 7,546,382 B2 * | 6/2009 | Healey et al. | ................... | 709/246 |
| 7,548,847 B2 * | 6/2009 | Acero et al. | ....................... | 704/9 |
| 7,729,912 B1 * | 6/2010 | Bacchiani et al. | ............. | 704/252 |
| 8,265,939 B2 * | 9/2012 | Kanevsky et al. | ............. | 704/275 |
| 8,768,969 B2 * | 7/2014 | Huerta et al. | ................... | 707/797 |
| 2003/0105634 A1 * | 6/2003 | Abella et al. | ..................... | 704/257 |
| 2003/0212544 A1 * | 11/2003 | Acero et al. | ....................... | 704/9 |
| 2003/0233230 A1 * | 12/2003 | Ammicht et al. | ............. | 704/235 |
| 2004/0024601 A1 * | 2/2004 | Gopinath et al. | ............. | 704/270 |
| 2004/0093201 A1 * | 5/2004 | Levin et al. | .................... | 704/201 |

(Continued)

OTHER PUBLICATIONS

Krahmer et al. "Error detection in Spoken Human-Machine Interaction", International Journal of Speech Technology, vol. 4, 2001.*

(Continued)

Primary Examiner — Abdelali Serrou (57) ABSTRACT

The present invention addresses the deficiencies in the prior art by providing an improved dialog for disambiguating a user utterance containing more than one intent. The invention comprises methods, computer-readable media, and systems for engaging in a dialog. The method embodiment of the invention relates to a method of disambiguating a user utterance containing at least two user intents. The method comprises establishing a confidence threshold for spoken language understanding to encourage that multiple intents are returned, determining whether a received utterance comprises a first intent and a second intent and, if the received utterance contains the first intent and the second intent, disambiguating the first intent and the second intent by presenting a disambiguation sub-dialog wherein the user is offered a choice of which intent to process first, wherein the user is first presented with the intent of the first or second intents having the lowest confidence score.

18 Claims, 6 Drawing Sheets

(56) References Cited

U.S. PATENT DOCUMENTS

| | | | |
|---|---|---|---|
| 2005/0165607 A1* | 7/2005 | Di Fabbrizio et al. | 704/256 |
| 2006/0010138 A1* | 1/2006 | Huerta et al. | 707/100 |
| 2006/0069560 A1* | 3/2006 | Passaretti et al. | 704/251 |
| 2006/0074657 A1* | 4/2006 | Huang | 704/246 |
| 2006/0122979 A1* | 6/2006 | Kapur et al. | 707/3 |
| 2006/0149555 A1* | 7/2006 | Fabbrizio et al. | 704/275 |
| 2006/0259294 A1* | 11/2006 | Tashereau | 704/10 |

OTHER PUBLICATIONS

McTear, "Spoken Dialogue Technology: Enabling the Conversational User Interface", ACM computing Surveys, vol. 34, No. 1, Mar. 2002.*

Swerts et al., "Correction in spoken dialogue systems", Sixth International Conference on Spoken Language, 2001.*

Suhm et al., "Multimodal error correction for speech user interfaces", ACM Trans. on Computer-Human Interfaces, vol. 8, No. 1, Mar. 2001.*

* cited by examiner

SYSTEM AND METHOD FOR DISAMBIGUATING MULTIPLE INTENTS IN A NATURAL LANGUAGE DIALOG SYSTEM

BACKGROUND OF THE INVENTION

1. Field of the Invention

The present invention relates to spoken dialog systems and more specifically to a system and method of disambiguating multiple intents in a user utterance.

2. Introduction

Conversational natural language interactive voice response (IVR) systems encourage callers to speak naturally and express their intent to a speech application without any constraints on how they can speak or what they can say. For example, the IVR systems indicate to the user that it is their turn to speak by saying "How may I help you?" This is an open-ended question in which the user can then simply ask a question. Within that question the user may indicate multiple questions, such as desiring both a cost and an availability of a product.

One problem that arises from caller's speech when it contains multiple intents. The problem relates to how the IVR system decides what intent to process first or which intent the caller actually wants processed. An additional problem relates to the current approach in resolving such ambiguity. If the IVR system is looking for specific intents of the user, such as defining one "intent" as the desire to know the price of something, the IVR system may categorize an input as having a confidence score associated with that intent. An example of this may be that the system assigns a 0.6 confidence score to an utterance that it believes is a price request.

The current approach uses just the confidence score whereby the intent classified by the spoken language understanding (SLU) model with a higher confidence is selected for processing. However, empirical evidence shows that using confidence scores often leads to an incorrect choice because of other factors affecting the data that is used to train the language understanding module. For example, the unequal distribution of utterances representing the various caller intents can sway the confidence associated with each intent. When the natural language IVR makes an incorrect choice, three negative consequences arise: (a) a caller may be sent to the wrong termination point leading to caller frustration; (b) when such termination is a separate IVR there is loss of revenue because not only will the caller not complete their call, but the network minutes used increases affecting the average handle time for the call; and (c) callers sent to the incorrect termination point are likely to drop out and call back leading to increased costs.

What is needed in the art is an improved manner of managing the spoken dialog where a user includes multiple intents in a user utterance.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art by providing an improved dialog for disambiguating a user utterance containing more than one intent. The invention comprises methods, computer-readable media, and systems for engaging in a dialog. The method embodiment of the invention relates to a method of disambiguating a user utterance containing at least two user intents. The method comprises establishing a confidence threshold for spoken language understanding to encourage that multiple intents are returned, determining whether a received utterance comprises a first intent and a second intent and, if the received utterance contains the first intent and the second intent, disambiguating the first intent and the second intent by presenting a disambiguation sub-dialog wherein the user is offered a choice of which intent to process first, wherein the user is first presented with the intent of the first or second intents having the lowest confidence score.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
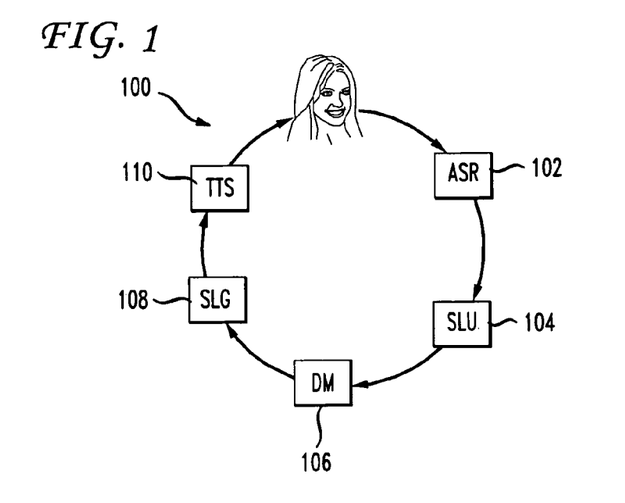
FIG. 1 illustrates an exemplary spoken dialog system.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110. The present invention focuses on innovations related to the dialog management module 106 and may also relate to other components of the dialog system.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
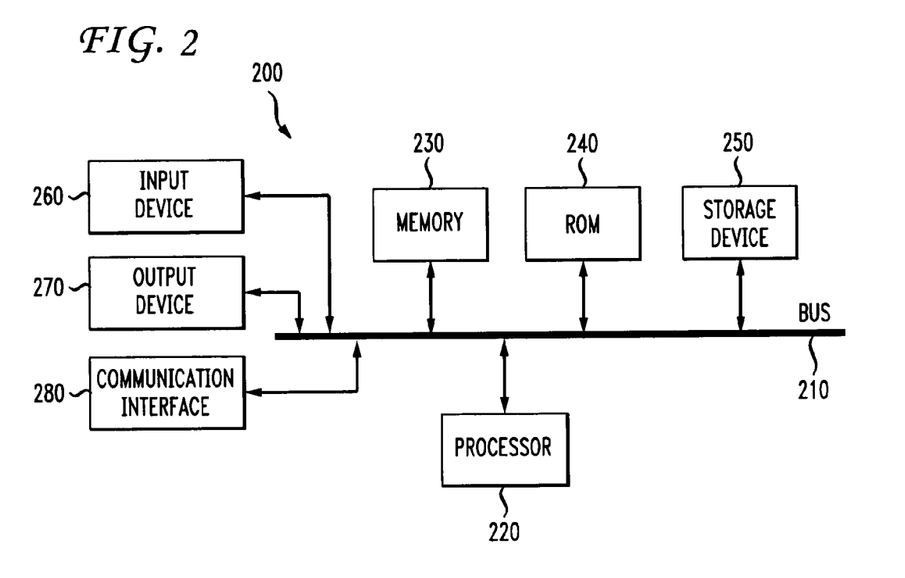
FIG. 2 illustrates an example computing device for use with the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
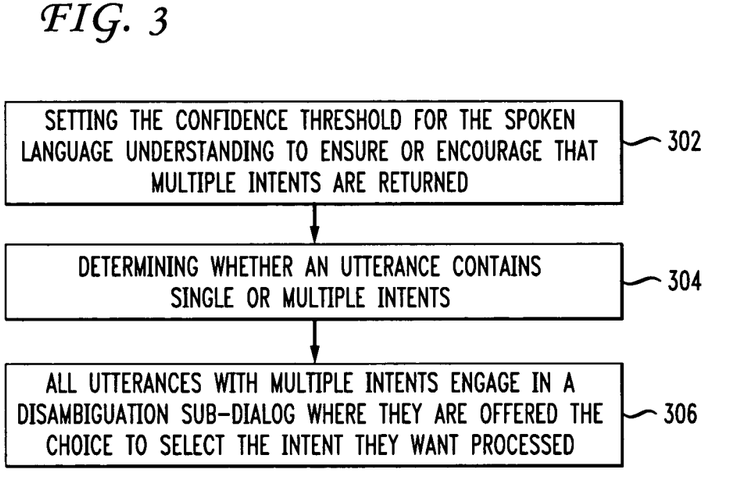
FIG. 3 illustrates a method embodiment of the invention.

FIG. 3 illustrates a method embodiment of the invention. Using dialog design to disambiguate multiple intents in a natural language application comprises in one aspect three steps. First step is to set the confidence threshold for the spoken language understanding to ensure or encourage that multiple intents are returned (302). As an example of this, a threshold of 0.1 may be set in order to include both intents with lots of utterances as well as those with not so many. This is important since, almost always, those intents with lots of utterances will be returned by the SLU. The threshold may insure that two intents are provided in return or may encourage or prompts the return of multiple intents. For example, a 0.3 threshold may encourage multiple intents but not as many as a 0.1 threshold. The next step is to determine whether an utterance contains single or multiple intents (304). This can be accomplished at the DM module. Finally, all utterances with multiple intents are sent to a disambiguation sub-dialog where they are offered the choice to select (decide) the intent they want processed (306). These options improve the dialog in a number of ways, for example, by giving the user control, saving system resources, and increasing call completion rate. The disambiguation sub-dialog will present to the user the first option of the multiple user intents with the lowest confidence score and end the sub-dialog prompt with the intent having the highest confidence score.

Figure 4A:
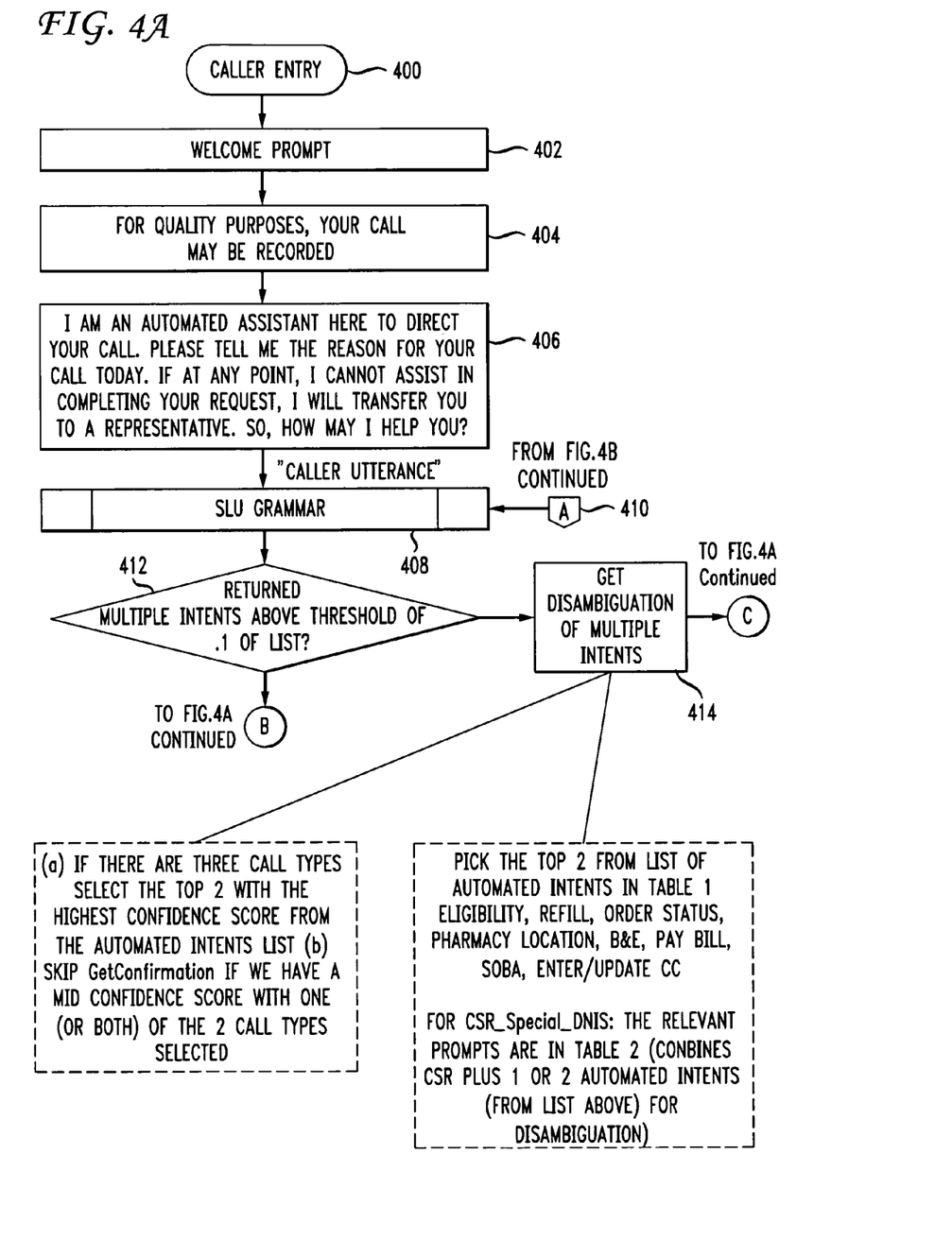
FIG. 4A illustrates a call flow associated with an aspect of the invention.
Figure 4B:
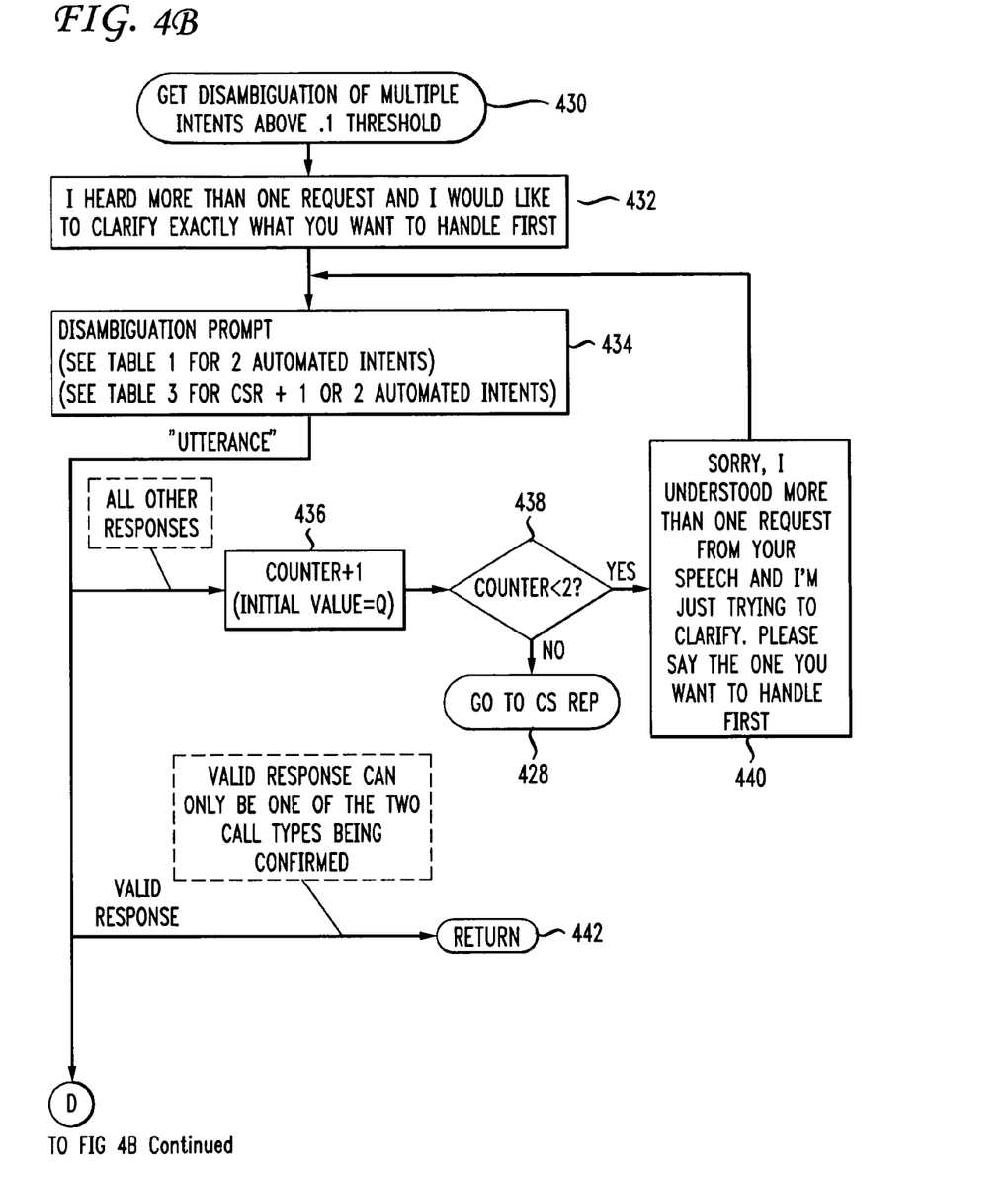
FIG. 4B illustrates a continuation of the call flow of FIG. 4A.

FIGS. 4A and 4B illustrate a flow chart of example steps according to an aspect of the invention. In natural language conversational IVR, as a call is initiated (400) and after introductory notices such as the call may be recorded (402) and a welcome prompt (404), callers hear an open-ended opening prompt that does not constrain the user response in any way. For example "Welcome to AT&T. I am an automated assistant. How may I help you?" (406). A user responds with a caller utterance that is applied to a spoken language understanding (SLU) grammar (408). The process next determines whether multiple intents above a threshold (such as, for example, 0.1) from the list are in the utterance (412). If yes, the process comprises obtaining disambiguation from the multiple intents (414). As an example, in response to the initial prompt a caller can say "I would like the price of a refill". This caller utterance is processed by the SLU and may return two caller intents: (a) caller is asking for price with a confidence score of 0.3; and (b) caller is asking for a refill with a confidence score of 0.8. This difference in confidence scores arises when some intents have more utterances instantiating those categories in the data used to train the SLU, as a result such intents receive higher confidence score than intents with fewer utterances. If the SLU confidence threshold is set low, such as to 0.1, multiple intents may be processed in the disambiguation sub-dialog of the dialog manager (or call flow).

In this disambiguation sub-dialog, the IVR plays a prompt of the following nature that is tailored to suit the particular multiple intents under consideration. The system says "I heard more than one request and I would like to clarify exactly what you want to handle first. If you are calling to get the price of your medication, say I need the price of medication" or "If you are calling to order a refill on an existing prescription, say 'I need a refill', please say the one you want now". Given these prompts from the system, the caller decides what they want the IVR to handle thus avoiding all of the problems discussed above.

Table 1 illustrates examples of how disambiguation prompts may be concatenated together for multiple automated intents. Using this table requires the concatenation of an initial, middle and closing prompt. Example steps for concatenating the prompts may include step 1: Play the relevant prompt from the queue of 5195 to 5207 that matches the lower score from the two ambiguous call types. Thus, if there are two intents or two call types in the utterance, the system will pick the one with the lower confidence score to "discuss" first. Step 2 involves inserting a conjunctive phrase [5194]; step 3 involves playing the relevant prompt from the queue of 5195 to 5207 that matches the higher score from the two ambiguous call types. Finally, step 4 involves playing a closing prompt 5208.

person asks to speak to a customer representative but included in the utterance is at least one intent that may be handled automatically. This requires the concatenation of initial, middle and closing parts of the dialog. Using this table 1, an example of how the system would concatenate the prompts where there is a disambiguation need for a CSR request plus at least one automated intent. Example steps may include step 1: play the initial prompt [5209]; step 2: select the relevant phrase from 5210-5219 that matches the highest confidence score for the automated call type(s); step 3: play initial prompt 2 [5220]; step 4: insert the conjunctive phrase [5194]; step 5: play the relevant prompt from the queue of 5221 to 5233 that matches the lowest score from two ambiguous call types (irrelevant if there is only CSR_1 automated intent.). The last few steps may comprise step 6: insert the conjunctive phrase [5194] (irrelevant if there is only CSR+1 automated intent); step 7: play the relevant prompt from the queue of 5221 to 5233 that matches the highest score from two ambiguous call types; and step 8: play the closing prompt [5208].

Insert Table 2.

TABLE 1

| Call Type | Tag | Tag Name | Spoken Text For any utterance with 2 automated intents |
|---|---|---|---|
| | 5197 | Call type conjunction | Or |
| Refill | 5195 | Middle prompt | If you are calling to order a refill on an existing prescription that you receive through the mailfrom ACME Health Solutions, say, "I need a refill" |
| When Refill | 5196 | Middle prompt | If you are calling to know when you can order your next refill, say, "next refill date" |
| Refills Remaining | 5197 | Middle prompt | If you are calling to know how many refills you have left, say, "How many refills left" |
| Vacation Fill | 5198 | Middle prompt | If you are calling to refill your medication before going away on vacation, say, "vacation advance" |
| Order status | 5199 | Middle prompt | If you are calling to find out the current status of an ongoing order you've sent in, say, "I need an order status" |
| Pharmacy Loc | 5200 | Middle prompt | If you are calling to locate retail participating pharmacies in your area, say, "I need to locate a retail pharmacy" |
| Explain Procedure | 5201 | Middle prompt | If you are calling to find out the instructions for getting prescriptions by mail, say, "How do I get started?" |
| Pay Bill | 5202 | Middle prompt | If you are calling to make a payment, say, "I need to make a payment" |
| Eligibility | 5203 | Middle prompt | If you are calling to check the eligibility status for an individual, say, "I need to check eligibility" |
| Pricing | 5204 | Middle prompt | If you are calling to get the price of your medication, say, "I need the price of medication" |
| Forms and Brochures | 5205 | Middle prompt | If you are calling to order materials such as forms, envelopes, or brochures, say, "I need forms" |
| Enter/Update CC | 5206 | Middle prompt | If you are calling to enter information for a credit card on file, say, "Update my credit card" |
| SOBA | 5207 | Middle prompt | If you are calling to order a summary of all the prescriptions you have received in the past year from ACME Health Solutions, say, "Account printout" |
| | 5208 | Closing prompt | Please say the one you want. |

Table 1 also shows the steps to disambiguate user input where there is a request for a customer service representative (CSR) plus one or more automated intents. For example, the

| Call type | Tag | Tag Name | Spoken Text CSR Request by Special DNIS |
|---|---|---|---|
| CSR + | 5209 | Initial prompt 1 Select relevant one | If you're calling to ask a customer service representative a question about 5210 [refill] 5211 [order status] 5212 [retail pharmacy location] 5213 [home delivery instructions] 5214 [payment] 5215 [eligibility] 5216 [pricing] 5217 [forms and brochures] 5218 [statement of benefits] 5219 [Updating of credit card information] |
| | 5220 | Initial prompt 2 | Say, "I need customer service" |
| | 5194 | Call type conjunction | Or |
| Refill | 5221 | Middle prompt | If you want to quickly use our automated system to process the refill of an existing medication that you receive through the mail from ACME Health Solutions, say, "I need a refill" |
| When Refill | 5222 | Middle prompt | If you want to quickly find out from our automated system when you can order your next refill, say, "Next refill date" |
| Refills Remaining | 5223 | Middle prompt | If you want to quickly find out from our automated system how many refills you have left, say, "How many refills left?" |
| Vacation Fill | 5224 | Middle prompt | If you want to quickly use our automated system to process the refill of your medication before going a3way on vacation, say, "vacation advance" |
| Order status | 5225 | Middle prompt | If you want to directly find out from our automated system the current status of an ongoing order you've sent in, say, "I need an order status" |
| Pharmacy Loc | 5226 | Middle prompt | If you want to quickly use our automated system to locate retail participating pharmacies in your area, say, "I need to locate a retail pharmacy" |
| Explain Procedure | 5227 | Middle prompt | If you want to quickly hear from our automated system instructions for getting prescriptions by mail, say, "How do I get started" |
| Pay Bill | 5228 | Middle prompt | If you want to quickly use our automated system to make a payment, say, "I need to make a payment" |
| Eligibility | 5229 | Middle prompt | If you want to quickly use our automated system to check the eligibility status for an individual, say, "I need to check eligibility" |

| Call type | Tag | Tag Name | Spoken Text CSR Request by Special DNIS |
|---|---|---|---|
| Pricing | 5230 | Middle prompt | If you want to quickly use our automated system to get the price of your medication, say, "I need the price of medication" |
| Forms and Brochures | 5231 | Middle prompt | If you want to quickly use our automated system to order materials such as forms, envelopes, or brochures, say, "I need forms" |
| Enter/Update CC | 5232 | Middle prompt | If you want to quickly use our automated system to enter information for a credit card in file, say, "Update my credit card" |
| SOBA | 5233 | Middle prompt | If you want to directly use our automated system to order a summary of al the prescriptions you have received in the past year from ACME Health Solutions, say, "account printout" |
|  | 5208 | Closing prompt | Please say the one you want. |

Returning to FIG. 4A, if the list does not have multiple intents above the threshold (412), then the method comprises applying precedent rules, such as, if an utterance contains a specific call type (such as Request (Call_Transfer) and (any other calltype), then return ONLY the other calltype or if an utterance contains a calltype (Yes, Hello) and (any other calltype), then return ONLY the other calltype (418). The call may be finished at this point if ONLY the other calltype is returned and everything is finished.

In one aspect of the invention, the call flow receives the input from (420) which is the result of the disambiguation of multiple intents (414). A dialog counter counts the dialog turns (420) and determines if the dialog counter is above a threshold such as 3 (422). Any threshold will suffice. If the dialog threshold has been met, then the system will provide input indicating that a customer service representative will be contacted for the question (424) and the call is transferred (428).

If the dialog counter is not above the threshold (422), then the call flow proceeds to FIG. 4B. In this figure, the first step is to get information associated with the disambiguation of the multiple intents above the threshold (430). The system provides a prompt, such as "I heard more than one request and I would like to clarify what you want to handle first" (432). The system then provides the disambiguation prompt taken from table 1 or table 2.

Step 434 in FIG. 4B involves providing the disambiguation prompt according to table 1 or table 2. The user provides another utterance. If the utterance is another type of response, a counter is triggered (436) and a determination is made about whether the counter is above a threshold (438). If the threshold is met, the system prompts for a re-iteration of the input (440) and the process returns to provide the disambiguation prompt again (434). An option for if the threshold is not met is to send the caller to a customer representative (428).

If the utterance in response to the disambiguation prompt is a valid response (typically identified as only one of the two call types being confirmed), then the system returns to the normal dialog with an answer (442). If the utterance includes a new request, where, for example, the caller requests a CSR (444). If the request is a CSR request (444) then the system sends the caller to the CSR (428). If the new request is something else, a counter is triggered (446) and a threshold is determined (448). If the counter is above a threshold value, then the system presents a prompt telling the caller that they will be transferred to a customer representative (456) and the call is routed (428). If the counter indicates that the count is less than a threshold (448), then a dialog counter threshold is checked (450) and the caller is either sent to step A (452 in FIG. 4B to 410 in FIG. 4A) to process the user utterance with the SLU grammar or the caller is routed to step L (454 in FIG. 4B to 426 in FIG. 4A) to provide a prompt indicating that the caller will be routed to a customer service representative.

There are several unique features associated with this invention. First, it provides intelligent constraints in an unconstrained system by offering the user complete control in making a decision about their intent instead of the machine in a participatory manner. Another benefit is the sequence of how the choices are presented to the caller is guided by established psycho-linguistic principle called the "end-focus principle". This principle says that a dialog should put the more salient questions or concepts at edges (i.e., beginning or end) where native speakers of the language can "naturally" retrieve them cognitively and auditorily. Based on this principle, an aspect of the invention is to handle the intent with the lower confidence first and the one with the higher confidence last.

Assuming that the preponderance of certain intent classes indicates user preference, then playing those higher confidence intents last allows the user to make effective choices. This invention is heavily needed to build trust in natural language conversational systems and succeeds in getting an unconstrained system to function effectively. This innovation is significant because it takes away one of the negatives against natural language IVRs, the allegation that "anything goes" and so it does not work. This innovation provides a participatory user interface for caller and system to collaborate for a successful call completion, with the attendant revenue benefits.

Embodiments within the scope of the present invention may also include non-transitory computer-readable storage media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other non-transitory medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the call flow can certainly vary from that shown in FIGS. 4A and 4B inasmuch as the primary focus of the invention is the disambiguation prompts and not the overall call flow. Accordingly, the appended claims and their legal equivalents should only define the invention, rather than any specific examples given.

I claim:

1. A method comprising:
    receiving, via an interactive voice recognition system, a user utterance and converting the user utterance to text;
    generating multiple intents based on the text;
    establishing, via the interactive voice recognition system, a confidence score for each intent in the multiple intents, wherein the confidence score for each intent is based on how much training data corresponding to the each intent was used to train a spoken language understanding module, where more training data corresponds to a higher confidence;
    when only a single intent in the multiple intents has a confidence score above a threshold:
        identifying a plurality of call types associated with the multiple intents; and
        applying predefined precedence rules to respond to only a single call type in the plurality of call types, the single call type associated with the single intent; and
    when multiple intents have confidence scores above the threshold:
        identifying a first intent and a second intent based on the confidence scores for the multiple intents, wherein the first intent and the second intent have a highest two confidence scores in the multiple intents; and
        disambiguating the first intent and the second intent by presenting a disambiguation sub-dialog, via the interactive voice recognition system, wherein a user is offered a choice of which intent to process first, wherein the user is first presented with one of the first intent and the second intent having a lowest confidence score between the first intent and the second intent.

2. The method of claim 1, wherein the disambiguation sub-dialog presents one of the first intent and second intent having a highest confidence score between the first intent and the second intent last.

3. The method of claim 1, further comprising:
    receiving a disambiguation utterance from the user clarifying which of the first intent and the second intent should be processed first.

4. The method of claim 1, wherein when the received utterance comprises the first intent and the second intent, then disambiguating the first intent and the second intent further comprises concatenating prompts from a table of call types.

5. The method of claim 1, wherein when the received utterance comprises a customer service representative request plus an intent, then disambiguating the received utterance further comprises concatenating prompts from a table of call types.

6. The method of claim 5, wherein when the received utterance comprises a customer service representative request plus the first intent and the second intent, then disambiguating the first intent and the second intent further comprises concatenating prompts from the table, wherein one of the first intent and the second intent having the lowest confidence score between the first intent and the second intent is played first and one of the first intent and the second intent having a highest confidence score between the first intent and the second intent is played last.

7. A computer-readable storage device having instructions stored which, when executed by a computing device, cause the computing device to perform operations comprising:
    receiving, via an interactive voice recognition system, a user utterance and converting the user utterance to text;
    generating multiple intents based on the text;
    establishing, via the interactive voice recognition system, a confidence score for each intent in the multiple intents, wherein the confidence score for each intent is based on how much training data corresponding to the each intent was used to train a spoken language understanding module, where more training data corresponds to a higher confidence;
    when only a single intent in the multiple intents has a confidence score above a threshold:
        identifying a plurality of call types associated with the multiple intents; and
        applying predefined precedence rules to respond to only a single call type in the plurality of call types, the single call type associated with the single intent; and
    when multiple intents have confidence scores above the threshold:
        identifying a first intent and a second intent based on the confidence scores for the multiple intents, wherein the first intent and the second intent have highest two confidence scores in the multiple intents; and
        disambiguating the first intent and the second intent by presenting a disambiguation sub-dialog, via the interactive voice recognition system, wherein a user is offered a choice of which intent to process first, wherein the user is first presented with one of the first intent and the second intent having a lowest confidence score between the first intent and the second intent.

8. The computer-readable storage device of claim 7, wherein the disambiguation sub-dialog presents one of the first intent and second intent having a highest confidence score between the first intent and the second intent last.

9. The computer-readable storage device of claim 7 having additional instructions stored which, when executed by the computing device, result in operations comprising:
    receiving a disambiguation utterance from the user clarifying which of the first intent and the second intent should be processed first.

10. The computer-readable storage device of claim 7, wherein when the received utterance comprises the first intent and the second intent, then disambiguating the first intent and the second intent further comprises concatenating prompts from a table of call types.

11. The computer-readable storage device of claim 7, when the received utterance comprises a customer service representative request plus an intent, then disambiguating the received utterance further comprises concatenating prompts from a table of call types.

12. The computer-readable storage device of claim 11, wherein when the received utterance comprises a customer service representative request plus the first intent and the second intent, then disambiguating the first intent and the second intent further comprises concatenating prompts from the table, wherein one of the first intent and the second intent having the lowest confidence score between the first intent and the second intent is played first and one of the first intent and the second intent having a highest confidence score between the first intent and the second intent is played last.

13. A system comprising:
a processor; and
a computer-readable storage device having instructions stored which, when executed by the processor, cause the processor to perform operations comprising:
receiving, via an interactive voice recognition system, a user utterance and converting the user utterance to text;
generating multiple intents based on the text;
establishing, via the interactive voice recognition system, a confidence score for each intent in the multiple intents, wherein the confidence score for each intent is based on how much training data corresponding to the each intent was used to train a spoken language understanding module, where more training data corresponds to a higher confidence;
when only a single intent in the multiple intents has a confidence score above a threshold:
identifying a plurality of call types associated with the multiple intents; and
applying predefined precedence rules to respond to only a single call type in the plurality of call types, the single call type associated with the single intent; and
when multiple intents have confidence scores above the threshold:
identifying a first intent and a second intent based on the confidence scores for in the multiple intents, wherein the first intent and the second intent have highest two confidence scores in the multiple intents; and
disambiguating the first intent and the second intent by presenting a disambiguation sub-dialog, via the interactive voice recognition system, wherein a user is offered a choice of which intent to process first, wherein the user is first presented with one of the first intent and the second intent having a lowest confidence score.

14. The system of claim 13, wherein the disambiguation sub-dialog presents one of the first intent and second intent having a highest confidence score between the first intent and the second intent last.

15. The system of claim 13, the computer-readable storage device having additional instructions stored which, when executed by the processor, result in operations comprising:
receiving a disambiguation utterance from the user clarifying which of the first intent and the second intent should be processed first.

16. The system of claim 13, wherein when the received utterance comprises the first intent and the second intent, then disambiguating the first intent and the second intent further comprises concatenating prompts from a table of call types.

17. The system of claim 13, wherein when the received utterance comprises a customer service representative request, then disambiguating the received utterance further comprises concatenating prompts from a table of call types.

18. The system of claim 17, wherein when the received utterance comprises a customer service representative request plus the first intent and the second intent, then disambiguating the first intent and the second intent further comprises concatenating prompts from the table, wherein one of the first intent and the second intent having the lowest confidence score between the first intent and the second intent is played first and one of the first intent and the second intent having a highest confidence score between the first intent and the second intent is played last.

* * * * *